(12) United States Patent
Sakai et al.

(10) Patent No.: US 11,256,016 B2
(45) Date of Patent: Feb. 22, 2022

(54) LINE ILLUMINATING DEVICE

(71) Applicant: Yazaki Corporation, Tokyo (JP)

(72) Inventors: Manabu Sakai, Shizuoka (JP); Yuuki Fujii, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/070,104

(22) Filed: Oct. 14, 2020

(65) Prior Publication Data

US 2021/0116621 A1 Apr. 22, 2021

(30) Foreign Application Priority Data

Oct. 16, 2019 (JP) .............................. JP2019-189231

(51) Int. Cl.
*G02B 6/42* (2006.01)
*F21V 8/00* (2006.01)

(52) U.S. Cl.
CPC ........... *G02B 6/001* (2013.01); *G02B 6/4242* (2013.01); *G02B 6/4243* (2013.01)

(58) Field of Classification Search
CPC .. F21V 19/00; F21V 19/0035; F21V 19/0045; F21V 19/0025; G02B 6/001; G02B 6/4242; G02B 6/4243; F21Y 2109/00
See application file for complete search history.

(56) References Cited

U.S. PATENT DOCUMENTS

| | | | | |
|---|---|---|---|---|
| 8,172,437 B2 * | 5/2012 | Burke | ................. | G02B 6/0008 362/477 |
| 9,182,095 B2 * | 11/2015 | Gomez | ................. | F21S 41/322 |
| 2009/0027739 A1 * | 1/2009 | Onishi | ................. | H04N 1/1017 358/475 |
| 2010/0209062 A1 * | 8/2010 | Sasada | ................. | G02B 6/4471 385/135 |
| 2013/0314756 A1 * | 11/2013 | Amemiya | ............... | F21V 13/04 358/497 |
| 2014/0347884 A1 * | 11/2014 | Fujiuchi | ................. | F21V 21/00 362/609 |
| 2014/0355303 A1 * | 12/2014 | Fujiuchi | ............... | H04N 1/0282 362/611 |
| 2014/0374580 A1 * | 12/2014 | Ishikawa | ................. | G01V 8/20 250/239 |
| 2014/0376254 A1 * | 12/2014 | Arimoto | .............. | G02B 6/0096 362/583 |

(Continued)

FOREIGN PATENT DOCUMENTS

JP 2019-050450 A 3/2019

*Primary Examiner* — Fatima N Farokhrooz
(74) *Attorney, Agent, or Firm* — Sughrue Mion, PLLC

(57) ABSTRACT

A line illuminating device includes: a light emitting unit that emits light; a light guide rod that is formed into a rod shape, transmits therethrough the light emitted by the light emitting unit, and guides the light in a longitudinal direction; a case that is formed into a rod shape, has a part open when viewed from the longitudinal direction, and houses the light guide rod therein; ribs provided so as to protrude from the light guide rod on both ends of the light guide rod in the longitudinal direction; and rib guide portions which are provided on both ends of the case in the longitudinal direction, guide the ribs when the light guide rod is housed in the case, and restricts rotation of the light guide rod with respect to the case.

7 Claims, 7 Drawing Sheets

(56) References Cited

U.S. PATENT DOCUMENTS

2015/0146433 A1* 5/2015 Suzuki ................. G02B 6/0006
  362/311.01
2016/0334626 A1* 11/2016 Sugihara .............. G02B 6/0045
2018/0284334 A1* 10/2018 Keating .................... F21V 7/22

* cited by examiner

ONE END SIDE
X DIRECTION
OTHER END SIDE

LINE ILLUMINATING DEVICE

CROSS-REFERENCE TO RELATED APPLICATIONS

The present application is based on and claims priority from Japanese Patent Application No. 2019-189231, filed on Oct. 16, 2019, the entire contents of which are incorporated herein by reference.

TECHNICAL FIELD

The present application relates to a line illuminating device.

BACKGROUND

An illuminating device of JP 2019-50450 A includes a light guide rod that is a rod-shaped light guide body, a light source unit, a case that is a cover member, and a cabinet, and introduces light into the light guide rod from the light source unit. The case of the illuminating device covers a side surface of the light guide rod and houses the light source unit therein. The case of the illuminating device is housed in the cabinet.

Further, a housing portion for housing the light source unit is provided in the case. A guide surface for guiding the light source unit, to the housing portion is provided in an opening of the housing portion.

SUMMARY

However, in a lighting unit in which a light guide rod is installed inside a case and a part of a side surface of the light guide rod is exposed without being covered with the case, an exposed surface of the light guide rod may be designated in some cases. In this case, a rotational movement angle of the light guide rod with respect to the case needs to be constant when viewed from a longitudinal direction of the case and the light guide rod.

It is an object of the present application to provide a line illuminating device capable of specifying an exposed surface of a light guide rod even if the light guide rod is formed into a circular shape when viewed from the longitudinal direction.

A line illuminating device according to an embodiment includes: a light emitting unit that emits light; a light guide rod that is formed into a rod shape, transmits therethrough the light emitted by the light emitting unit, and guides the light in a longitudinal direction; a case that is formed into a rod shape, has a part open when viewed from the longitudinal direction of the light guide rod, and houses the light guide rod therein; a rib provided so as to protrude from the light guide rod on at least one end of both ends of the light guide rod in the longitudinal direction; and a rib guide portion that is provided on at least one end of both ends of the case in the longitudinal direction, guides the rib when the light guide rod is housed in the case, and restricts rotation of the light guide rod with respect to the case.

In the line illuminating device according to the embodiment, the rib is provided on each of birth ends of the light guide rod in the longitudinal direction, and the rib guide portion is also provided on each of both ends of the case.

In the line illuminating device according to the embodiment, a protrusion is provided on the rib provided on one end of the light guide rod in the longitudinal direction, the rib belonging to the ribs provided on both ends thereof, the protrusion of the rib protrudes from the rib on at least one side of the rib in a width direction when viewed from the longitudinal direction of the light guide rod, and the protrusion is configured to be engaged with the rib guide portion when the light guide rod is housed in the case.

A line illuminating device according to an embodiment includes; a light emitting unit that emits light; a light guide rod that is formed into a columnar shape, introduces the light emitted from the light emitting unit into an inside thereof from a first longitudinal end that is one end in a longitudinal direction, and guides the light in the longitudinal direction; a case that is formed into a rod shape, has an inner surface formed into a "U" shape by opening a part when viewed from the longitudinal direction, and houses the light guide rod therein while a circular-arc curved surface with the "U" shape and a half of an outer circumference of a circle of the light guide rod contact each other or face each other with a slight gap therebetween when viewed from the longitudinal direction; a rectangular parallelepiped first rib that is provided so as to protrude from the light guide rod on a first longitudinal end that is one end of the light guide rod in the longitudinal direction; a rectangular parallelpiped second rib that is provided so as to protrude from the light guide rod on a second longitudinal end that is other end of the light guide rod in the longitudinal direction and overlaps the first rib when viewed front the longitudinal direction of the light guide rod; a first rib guide portion that is provided on a first longitudinal end that is one end of the case in the longitudinal direction, guides the first rib when the light guide rod is housed in the case, and restricts rotation of the light guide rod with respect to the case; a second rib guide portion that is provided on a second longitudinal end that is other end of the case in the longitudinal direction, overlaps the first rib guide portion when viewed from the longitudinal direction of the case, guides the second rib when the light guide rod is housed in the case, and restricts the rotation of the light guide rod with respect to the case; and protrusions which are provided on both ends of the first rib in a width direction, and are engaged with the first rib guide portion when the light guide rod is housed in the case.

In accordance with the above configuration, there can be provided the line illuminating device capable of specifying the exposed surface of the light guide rod even if the light guide rod is formed into a circular shape when viewed from the longitudinal direction.

DETAILED DESCRIPTION

Figure 1:
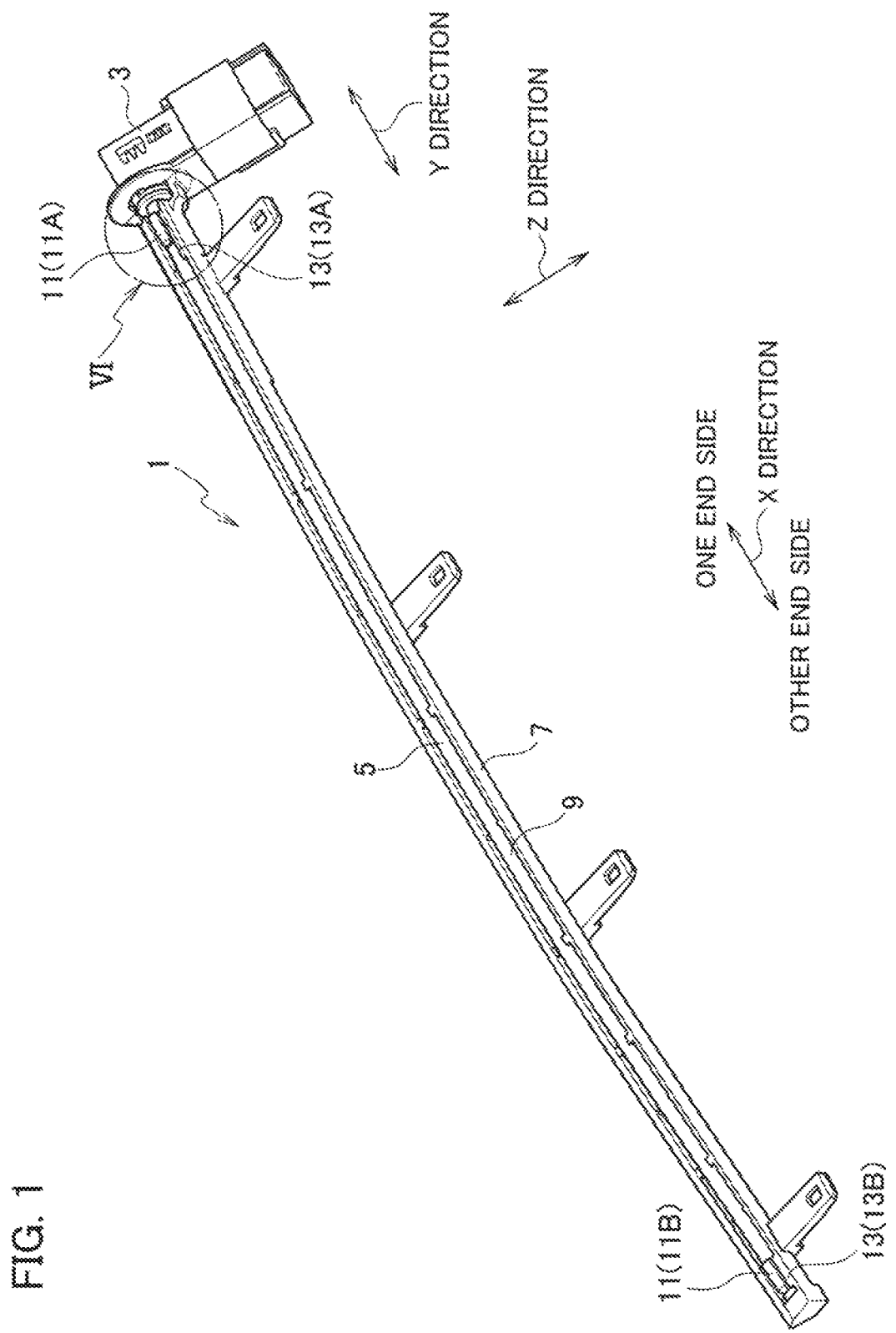
FIG. 1 is a perspective view of a line lighting unit according to an embodiment of the present application.
Figure 2:
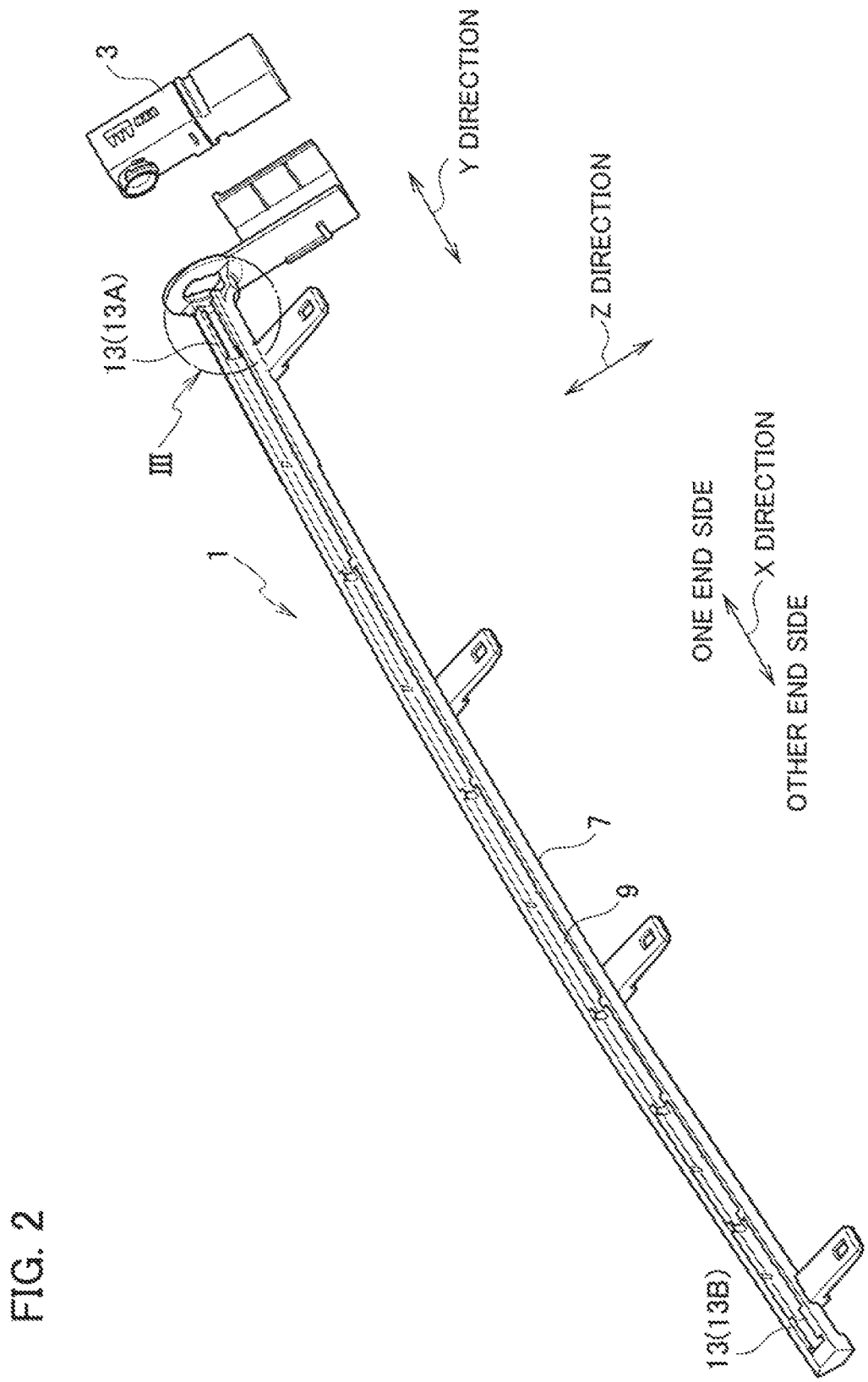
FIG. 2 is a perspective view of the line lighting unit according to the embodiment of the present application, and is a view illustrating a state in which a light emitting unit is detached from a case in which a light guide rod is not installed.

A line illuminating device 1 according to an embodiment of the present application is installed and used, for example, in a vehicle cabin, and as illustrated in FIGS. 1 and 2, is configured by including a light emitting unit 3, a light guide rod 5, and a case 7.

Figure 4:
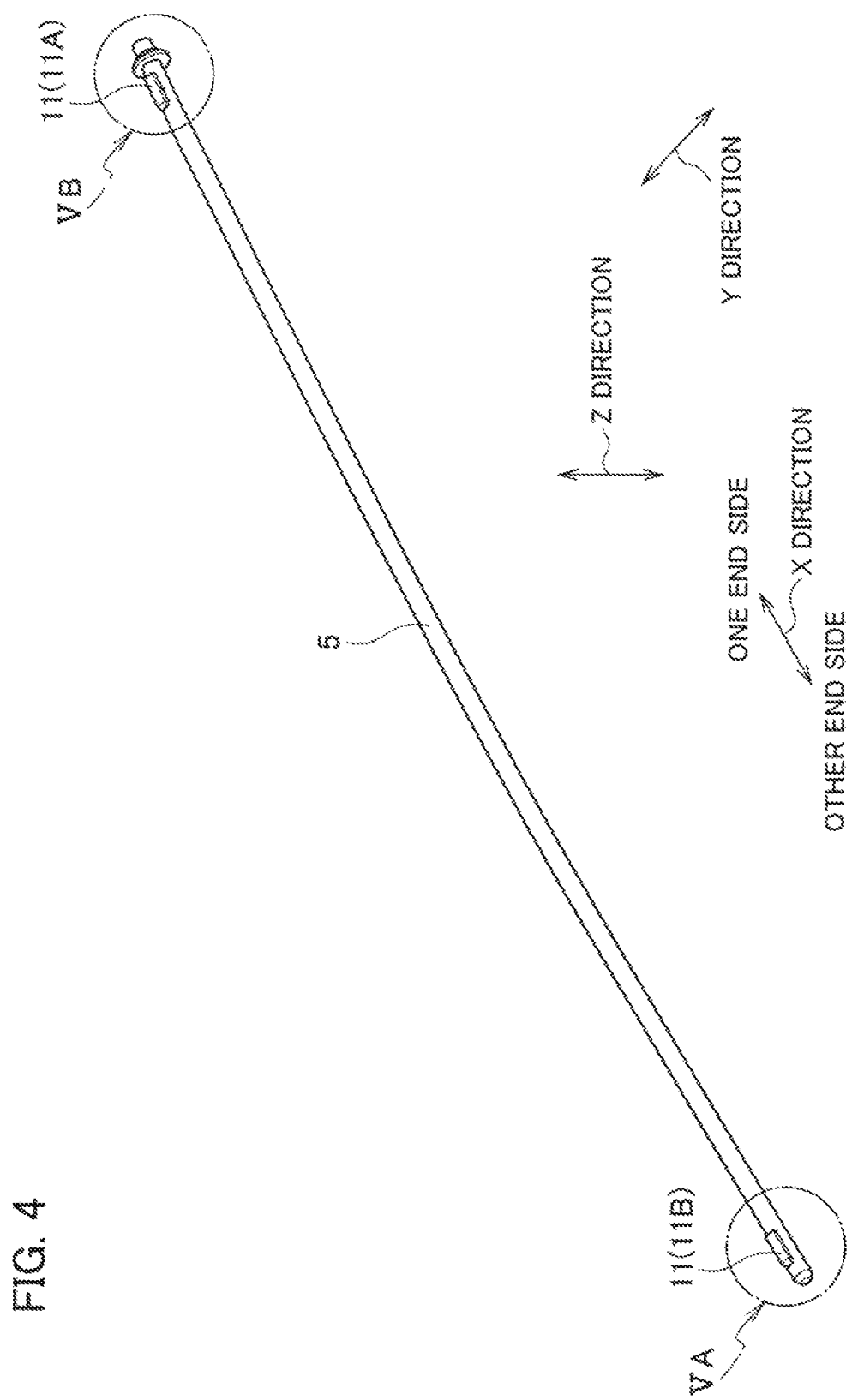
FIG. 4 is a perspective view of the light guide rod of the line lighting unit according to the embodiment of the present application.

Here, for convenience of description, as illustrated in FIGS. 1 and 4, a predetermined direction parallel to a longitudinal direction of a light guide rod 5 in the line illuminating device is defined as an X direction, and a predetermined direction orthogonal to the X direction is defined as a Y direction, and a direction orthogonal to the X direction and the Y direction is defined as a Z direction. Note that directions such as a "front-rear" direction and an "up-down" direction are defined for convenience of description, and do not limit actual mounting postures of the respective elements.

For example, the light emitting unit 3 emits visible light of a white color or the like by an LED.

The light guide rod 5 is formed into a rod shape such as a columnar shape elongated in the X direction by a material with transparency including colored transparency or material wit translucency including colored translucency. Further, the light guide rod 5 introduces light emitted from the light emitting unit 3 into an inside thereof from a first longitudinal end thereof, which is one end in the X direction as a longitudinal direction, transmits the light therethrough, and guides the light in the longitudinal direction.

Figure 7A:
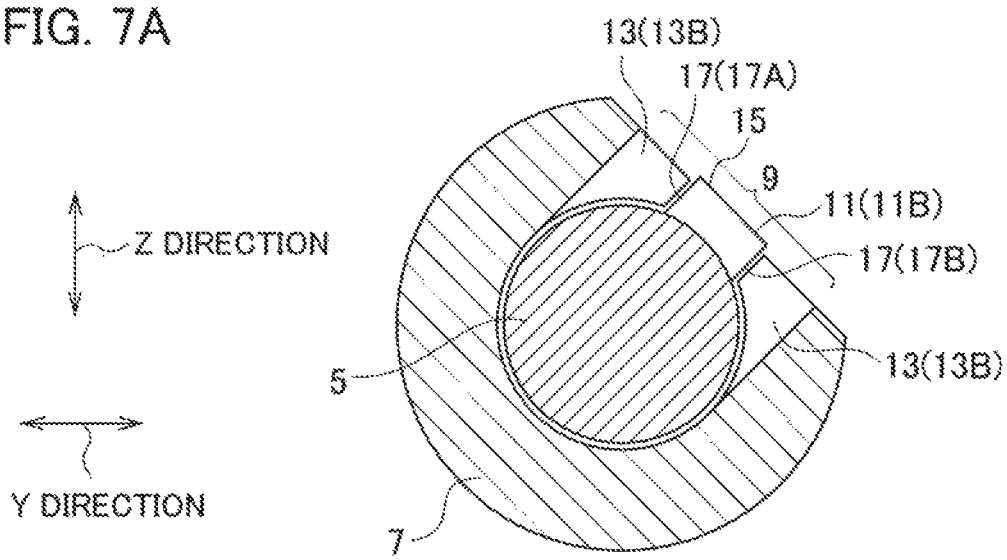
FIG. 7A is a view of an engagement state between a second-end rib of rite light guide rod and second-end rib guide portions of the case as seen from an X direction.

The case 7 is formed into an elongated rod shape by a material that does not transmit light therethrough, and as illustrated in FIG. 7A and the like, a part thereof is open when viewed from the X direction as the longitudinal direction. That is, when the case 7 is viewed from the X direction as the longitudinal direction, an opening 9 is partially formed, and the light guide rod 5 is housed and installed inside the case 7. In a state in which the light guide rod 5 is installed, the longitudinal direction of the light guide rod 5 and the longitudinal direction of the case 7 coincide with each other, and the light guide rod 5 and the case 7 extend in the X direction.

Note that the light guide rod 5 and the case 7 have some flexibility and are slightly bent, but the longitudinal direction is the X direction even when both of them are slightly bent.

Figure 5A:
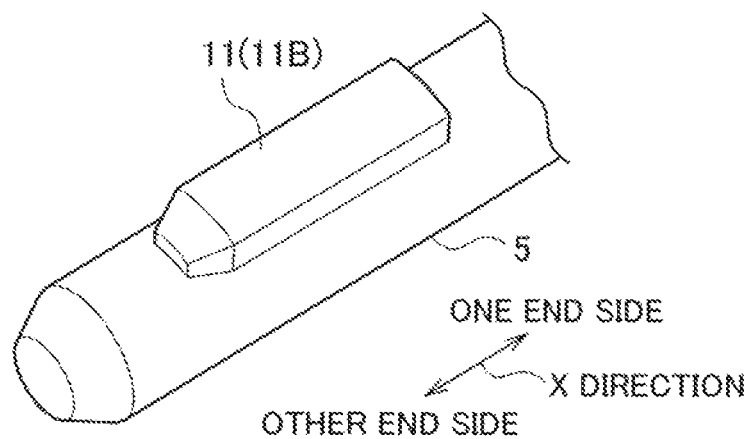
FIG. 5A is an enlarged view of a portion VA in FIG. 4.
Figure 5B:
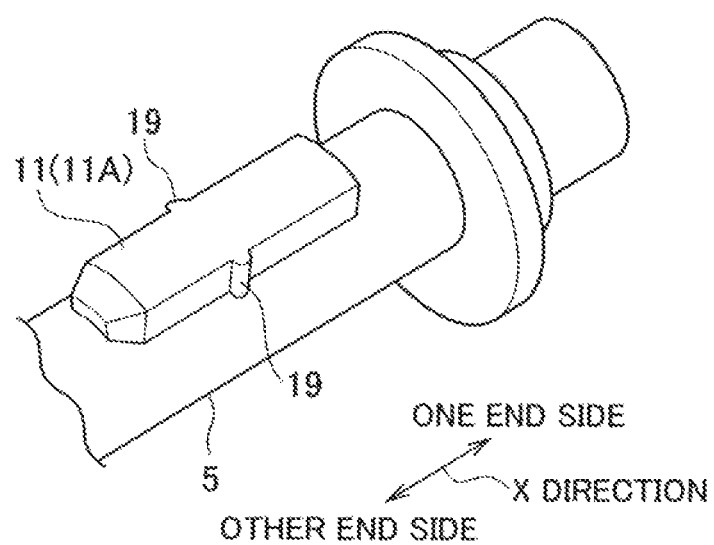
FIG. 5B is an enlarged view of a portion VB in FIG. 4.

As illustrated in FIGS. 4, 5A and the like, ribs 11 are provided on the light guide rod 5 so as to protrude from the light guide rod 5. The ribs 11 are provided on both ends of the light guide rod 5 in the longitudinal direction (X direction). That is, as the ribs 11, a first-end rib 11A and a second-end rib 11B are provided. Note that the rib 11 may be configured to be provided on at least one end of the both ends of the light guide rod 5 in the longitudinal direction. Further, the ribs 11 may be composed of a material that transmits light therethrough or may be composed of a material that does not transmit light therethrough.

The light guide rod 5 and the ribs 11 are formed by integral molding, but may be configured to be formed as separate bodies, and to install the ribs 11 on the light guide rod 5 later.

The case 7 is provided with rib guide portions 13. The rib guide portions 13 are also provided on both ends of the case 7 in the longitudinal direction (X direction) so as to match the ribs 11. That is, as the rib guide portions 13, first-end rib guide portions 13A and second-end rib guide portions 13B are provided. Note that the rib guide portion 13 may be configured to be provided on at least one end of the both ends of the light guide rod 5 in the longitudinal direction (X direction) so as to correspond to the rib 11. Further, the rib guide portions 13 may be composed of a material that transmits light therethrough or may be composed of a material that does rot transmit light therethrough.

The case 7 and the rib guide portions 13 are formed by integral molding, but may be configured to be formed as separate bodies, and to install the rib guide portions 13 on the case 7 later.

The rib guide portions 13 guide the ribs 11 when the light guide rod 5 is housed in the case 7, and restricts rotation (rotational movement) of the light guide rod 5 with respect to the case 7. The above-described rotation is rotation about the central axis of the columnar light guide rod 5.

More specifically, as illustrated in FIG. 7A, in the light guide rod 5, a cross-sectional shape thereof formed by a plane orthogonal to the longitudinal direction (X direction) is formed into a circular shape.

As illustrated in FIG. 7A, the inner surface of the case 7 is formed into a constant shape such as a "U" shape in a cross section by a plane orthogonal to the longitudinal direction (X direction), and the case 7 is formed into a columnar shape. In other words, it can be said that the case 7 is formed into a tubular shape provided with a notch that forms the opening 9. Note that the cross-sectional shape of the inner surface of the case 7 formed by the plane orthogonal to the longitudinal direction may be formed into a constant shape such as a "C" shape. The outer surface of the case 7 in FIG. 7A is drawn in a simplified manner.

As illustrated in FIG. 2 and the like, the opening 9 extends over the entire length of the case 7 in the longitudinal direction (X direction). Further, when the case 7 formed into a columnar shape and a tubular shape is viewed from the longitudinal direction, a curved portion of the inner surface of the "U" shape of such a tube is formed into a circular arc shape. A radius of such a circular arc is approximately a half of an outer diameter of the columnar light guide rod 5.

As illustrated in FIGS. 4, 5A, 7A and the like, each of the ribs 11 is formed into a rectangular parallelepiped shape. An upper surface 15 of the rib 11 is formed into a planar shape, and when viewed from the X direction, the upper surface 15 of the rib 11 is a line segment having a predetermined length. When viewed from the X direction, a perpendicular bisector of the line segment that represents the upper surface 15 of the rib 11 passes through the center of a circle of the light guide rod 5. Further, when viewed from the X direction, a value of the length of live fine segment that represents the upper surface 15 of the rib 11 is smaller than a value of five diameter of the circle of the fight guide rod 5.

A pair of side surfaces 17 (17A, 17B) of each of the ribs 11 are also formed into a planar shape, and when viewed from the X direction, the pair of side surfaces 17 of each of the ribs 11 is also line segments with a predetermined length. When viewed from the X direction, the line segment that represents one side surface 17A of the rib 11 is orthogonal to the line segment that has a predetermined length and represents the upper surface 15 of the rib 11. Moreover, the line segment that represents the one side surface 17A of the rib 11 extends from one end of the line segment that has a predetermined length and represents the upper surface 15 of the rib 11 to an outer circumference of the circle of the light guide rod 5.

When viewed from the X direction, a line segment that represents other side surface 17B of the rib 11 is orthogonal to the line segment that has a predetermined length and represents the upper surface 15 of the rib 11. Further, the line segment that represents the other side surface 17B of the rib 11 extends from other end of the line segment that has a predetermined length and represents the upper surface 15 of the rib 11 to the outer circumference of the circle of the light guide rod 5.

A plurality of notches (not shown) are provided on a part of the side surface of the light guide rod 5. The plurality of notches are provided side by side in the longitudinal direction (X direction) of the light guide rod 5. When viewed from the X direction, the plurality of notches overlap one another. Further, when viewed from the X direction, the plurality of notches are located on an opposite side to live opening 9 of the case 7 when the light guide rod 5 is installed in the case 7.

The plurality of these notches are provided, whereby the intensity of light emitted from the side surface of the light guide rod 5 becomes substantially uniform in the longitudinal direction of the light guide rod 5. That is, unevenness of the intensity of the light, which is emitted from the opening 9 of the case 7, in the longitudinal direction of the case 7 can be eliminated as much as possible.

As illustrated in FIG. 7A, when the light guide red 5 is viewed from the X direction, a circumferential region of the light guide rod 5 provided with the first-end rib 11A and a circumferential region of the light guide rod 5 provided with the second-end rib 11B coincide with each other. Further, when the light guide rod 5 is viewed from the X direction, a protruding height of the first-end rib 11A from the light guide rod 5 in a X direction and a protruding height of the second-end rib 11B from the light guide rod 5 in the V direction are equal to each other. That is, when the light guide rod 5 is viewed from the X direction, all of the first-end rib 11A and all of the second-end rib 11B overlap each other.

When the case 7 is viewed from the X direction, a value of a dimension in a Y' direction between the two rib guide portions 13 provided in the case 7 is smaller titan a value of a dimension of the opening 9 of the case 7 in the Y' direction. Further, when viewed from the X direction, a value of the length of the line segment that represents the upper surface 13 of the rib 11 is slightly smaller than the value of the dimension in the Y' direction between the rib guide portions 13 provided in the case 7.

Note that the Y' direction and the T direction are directions obtained by rotating the Y direction and the Z direction by a predetermined angle about an axis that extends in the X direction.

Protrusions 19 are provided on the rib 11A provided on one end of the light guide rod 5 in the longitudinal direction (X direction), the rib 11A belonging to the ribs 11 provided on both ends thereof. The protrusions 19 are provided only on the rib 11A. Note that the protrusions 19 may be provided only on the rib 11B of the ribs 11, which is provided on the other end.

The rib 11A and the protrusions 19 are formed by integral molding, but may be configured to be formed as separate bodies, and to install the protrusions 19 on the rib 11A later.

Figure 7B:
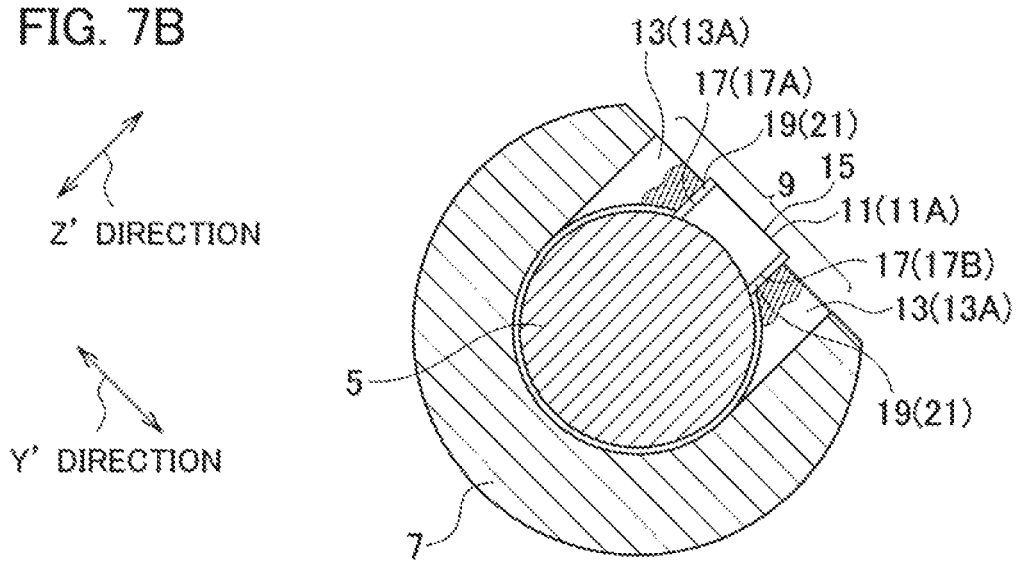
FIG. 7B is a view of an engagement state between a first-end rib of live light guide rod and first-end rib guide portions of the case as seen from then X direction.

When viewed from the longitudinal direction of the light guide rod 5, as illustrated in FIG. 7B, the protrusions 19 protrude from the first-end rib 11A on both sides of the first-end rib 11A in the width direction (Y' direction). Note that the protrusion 19 may be configured to protrude from the first-end rib 11A on at least one side of the first-end rib 11A in the width direction.

Figure 3:
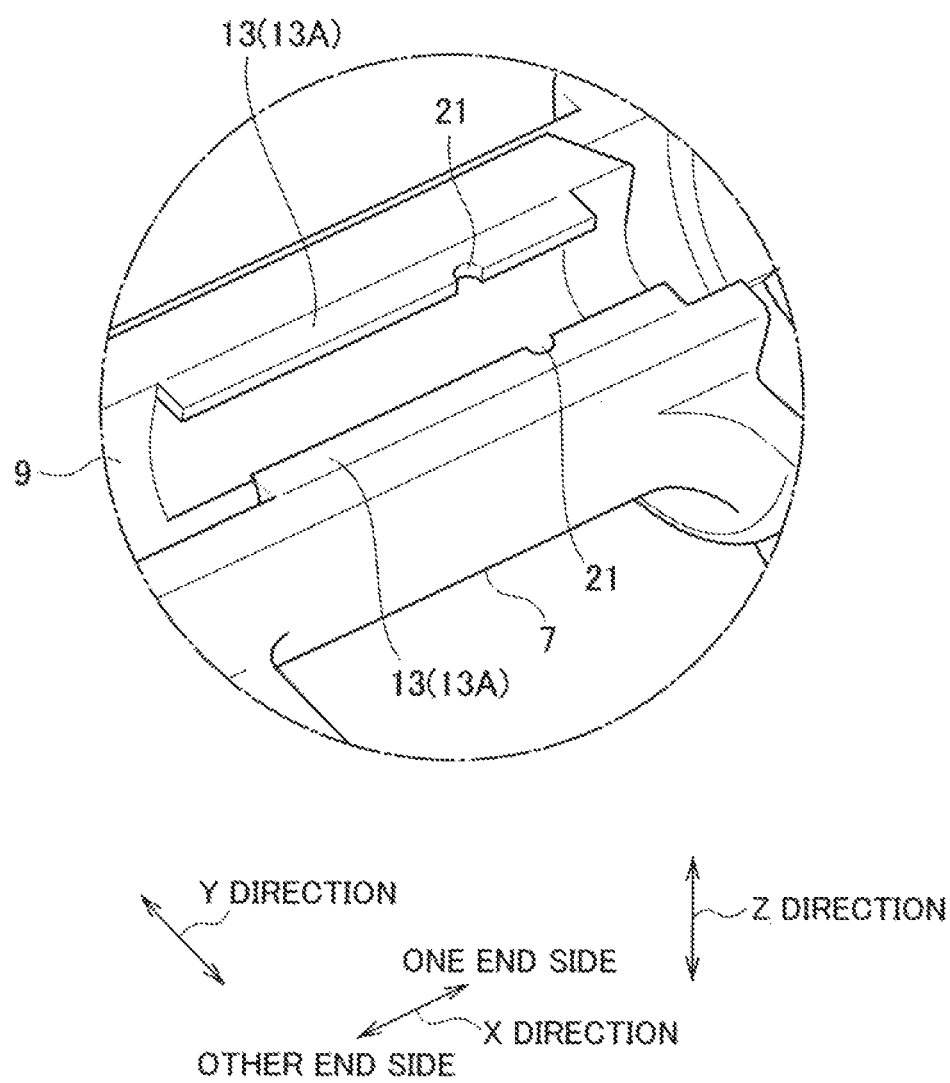
FIG. 3 is an enlarged view of a portion III in FIG. 2.
Figure 6:
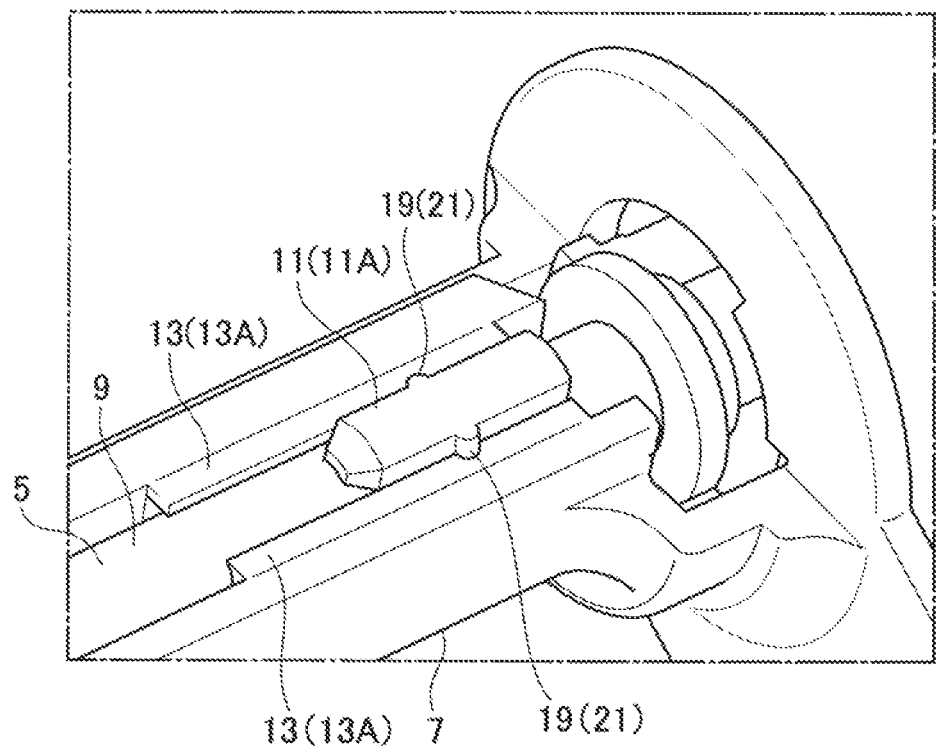
FIG. 6 is an enlarged view of a portion VI in FIG. 1.

Then, when the light guide rod 5 is housed in the case 7, as illustrated in FIG. 6, the protrusions 19 are configured to be engaged with first-end rib guide portions 13A located close to the light emitting unit 3. Note that, as illustrated in FIG. 3 and the like, small recesses 21 are formed on live first-end rib guide portions 13A. Then, when the light guide rod 5 is housed in the case 7, the protrusions 19 enter the small recesses 21, so that the first-end rib 11A is engaged with the first-end rib guide portions 13A.

When the case 7 in which the light guide rod 5 is installed is viewed from the X direction, as illustrated in FIG. 7A, the inner surface of the case 7 is formed into the "U" shape as mentioned above. A pair of the rib guide portions 13 protrude from two individual linear portions of the "U" shape of the inner surface of the case 7. Thus, the inner surface of the case 7 and the inner surfaces of the pair of rib guide portions 13 are formed into a "C"-shaped circular arc shape. The center of the circular arc and the center of the light guide rod 5 coincide with each other.

Further, when the case 7 in which the light guide rod 5 is installed is viewed from the X direction, as illustrated in FIG. 7A, the light guide rod 5 is housed inside the case 7 while the "U"-shaped circular arc curved surface of the case 7 and a half of the outer circumference of the circle of the light guide rod 5 face each other with a slight gap therebetween or contact each other.

Further, when the case 7 in which the light guide rod 5 is installed is viewed from the X direction, as illustrated in FIG. 7A, the light guide rod 5 is housed inside the case 7 while the circular arc curved surfaces of the pair of rib guide portions 13 and a part of the outer circumference of the circle of the light guide rod 5 slightly separate from each other or contact each other.

This prevents the light guide rod 5 from moving in the Z' direction and the Y' direction in FIG. 7B with respect to the case 7, and prevents the light guide rod 5 from getting out of the opening 9 of the case 7.

The first-end rib (first rib) 11A provided so as to protrude from the light guide rod 5 at the first end, which is one end of the tight guide rod 5 in the longitudinal direction (X direction), is formed into a rectangular parallelepiped shape as mentioned above. The second-end rib (second rib) 11B provided so as to protrude from the light guide rod 5 at the second end, which is other end of the light guide rod 5 in the longitudinal direction, is also formed into a rectangular parallelepiped shape as mentioned above.

The first-end rib guide portions (first rib guide portions) 13A are provided on the first longitudinal end that is one end of the case 7 in the longitudinal direction (X direction). Then, the first rib guide portions 13A guide the first rib 11A when the light guide rod 5 is housed in the case 7, and restricts the rotation of the light guide rod 5 with respect to the case 7.

The second-end rib guide portions (second rib guide portions) 13B are provided on the second longitudinal end that is other end of the case 7 in the longitudinal direction (X direction). Then, the second rib guide portions 13B guide the second rib 11B when the light guide rod 5 is housed in the case 7, and restricts the rotation of the light guide rod 5 with respect to the case 7.

Further, the second rib 11B is configured to be guided by the first rib guide portions 13A in an initial state at the time when the light guide rod 5 is housed in the case.

Figure 7C:
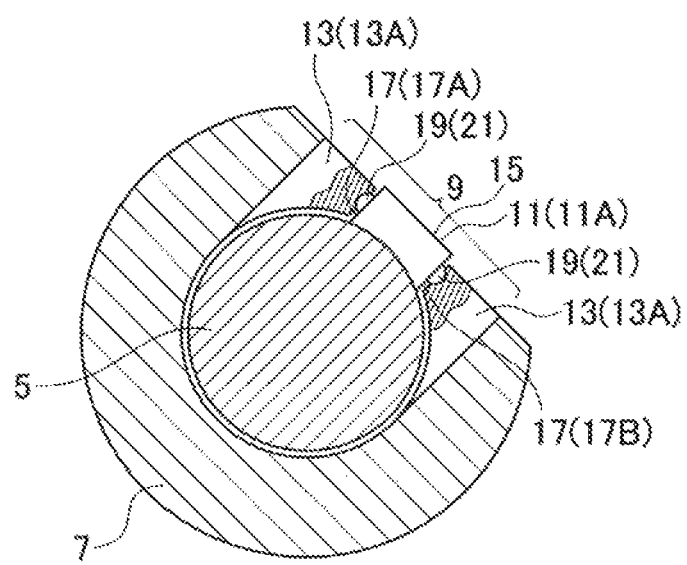
FIG. 7C is a view corresponding to FIG. 7B, and is a view illustrating protrusions of a rib according to a modification example.

As illustrated in FIG. 7B, the protrusions 19 are linear and protrude in the Z' direction over the entire first-end rib 11A. Note that, as illustrated in FIG. 7C, the protrusions 19 may protrude in a dot shape at intermediate portions of the first-end rib 11A in the Z' direction.

Moreover, the protrusions 19 may be configured to be elastically deformed and abut against the rib guide portions 13 by urging force in a state in which the light guide rod 5 is completely installed in the case 7 while eliminating the small recesses 21 or making a size of the small recesses 21 smaller than a size of the protrusions 19.

Next, an assembly procedure of the line illuminating device 1 will be described.

In a preparation state at the time when the light guide rod 5 is housed in the case 7, the light guide rod 5 is separated from the case 7, and is located behind the case 7 (located close to one end side in the X direction). In the preparation state at the time when the light guide rod 5 is housed in the case 7, the center of the "U"-shaped circular arc of the case 7 and the center of the circle of the light guide rod 5 coincide with each other when viewed from the longitudinal direction of the light guide rod 5 and the case 7. Further, in the preparation state at the time when the light guide rod 5 is housed in the case 7, a rotational movement angle position of each of the rib guide portions 13 and a rotational movement angle position of each of the ribs 11 coincide with each other when viewed from the longitudinal direction of the light guide rod 5 and the case 7.

Then, the light guide rod 5 is moved forward (moved close to the other end side in the X direction) with respect to the case 7 from the preparation state at the time when the light guide rod 5 is housed in the case 7, whereby the light guide rod 5 is housed in the case 7.

In the initial state at the time when the light guide rod 5 is housed in the case 7. First, the second rib 11B enters between the first rib guide portions 13A and are guided by the first rib guide portions 13A. The light guide rod 5 is moved further forward with respect to the case 7, whereby the second rib 11B is sandwiched and guided by the second rib guide portions 13B, and the first rib 11A is sandwiched and guided by the first rib guide portions 13A.

After the light guide rod 5 is completely housed in the case 7, the light emitting unit 3 is installed in the case 7 and the light guide rod 5.

Next, the operation of the line illuminating device 1 will be described.

When the light emitting unit 3 emits light, the light enters the light guide rod 5 from a circular first end surface of the light guide rod 5 in the longitudinal direction, and travels through the light guide rod 5 toward a second end thereof in the longitudinal direction.

Then, the light is emitted from the side surface of the light guide rod 5, and the emitted light is linearly emitted from the opening 9 of the case 7 to the outside of the line illuminating device 1.

The line illuminating device 1 includes: the ribs 11 provided so as to protrude from the light guide rod 5; and the rib guide portions 13 which guide the ribs 11 and restrict the rotation of the light guide rod 5 with respect to the case 7 when the light guide rod 5 is housed in the case 7. Thus, even if the light guide rod 5 is formed into a circular shape when viewed from the longitudinal direction, an exposed surface of the light guide rod 5, which is exposed at the opening 9 of the case 7, can be designated.

As a result, when the light guide rod 5 is installed in the case 7, the plurality of notches (not shown) provided in the light guide rod 5 can be located on the opposite side to the opening 9 of the case when viewed from the X direction, and the light can be emitted from the opening 9 of the case 7 in a good state.

An illuminating device 301 according to a comparative example includes a light guide rod 303, a light emitting unit, a case 307, and a cabinet 309.

In the illuminating device 301 according to the comparative example, the case 307 is also formed into a rod shape like the light guide rod 303. Then, the light guide rod 303 is installed inside the case 307 so that a longitudinal direction of the light guide rod 303 and a longitudinal direction of the case 307 coincide with each other. Further, with regard to the illuminating device 301 according to the comparative example, when the light guide rod 303 and the case 307 are viewed from the longitudinal direction thereof, a part of a side surface of the light guide rod 303 is exposed without being covered with the case 307.

In the illuminating device 301 according to the comparative example, an exposed surface of the light guide rod 303 may be designated in some cases, in this case, a rotational movement angle of the light guide rod 303 with respect to the case 307 needs to be set to a constant value when viewed from the longitudinal direction of the case 307 and the light guide rod 303.

Accordingly, a shape of the light guide rod 303 when viewed from the longitudinal direction needs to be limited to a non-circular shape such as a rectangular shape, and to prevent the light guide rod from rotationally moving with respect to the case 307.

On the other hand, in the line illuminating device 1 of the present application, since the ribs 11 and the rib guide portions 13 are provided, the exposed surface of the light guide rod 5, which is exposed at the opening 9, can be designated even if the light guide rod 5 is formed into a circular shape when viewed from the longitudinal direction.

Further, according to the line illuminating device 1, since the light guide rod 5 is formed into a columnar shape, the light guide in the light guide rod 5 can be efficiently performed in comparison with the case where the light guide rod 5 is formed into a non-columnar shape such as a quadrangular prism shape.

Further, since the ribs 11 are provided only on both ends of the light guide rod 5 in the longitudinal direction and are not provided on a middle portion thereof in the longitudinal direction, this also ensures that the light guide in the light guide rod 5 can be performed efficiently.

Further, in the line illuminating device 1, the ribs 11 are provided on both ends of the light guide rod 5 in the longitudinal direction, and the rib guide portions 13 are also provided on both ends of the case 7. Thus, when the light guide rod 5 is housed in the case 7 and completely installed therein, the respective ribs 11 are individually guided by the respective rib guide portions 13. Then, the light guide rod 5 can be prevented from twisting, and the rotational movement of the light guide rod 5 with respect to the case 7 can be restricted more surely.

Further, in the line illuminating device 1, the protrusions 19 are provided on the first rib 11A, and when the light guide rod 5 is housed in the case 7, the protrusions 19 are configured to be engaged with the first rib guide portion 13A. Thus, rattling of the light guide rod 5 can be suppressed in addition to the restriction of the rotational movement of the light guide rod 5 with respect to the case 7.

Further, in the line illuminating device 1, the second rib 11B is guided by the first rib guide portion 13A in the initial stale of assembly, so that the light guide rod 5 can be installed in the case 7 without making a mistake in the rotation direction of the light guide rod 5 with respect to the case 7 in the initial state of assembly.

Note that, in FIG. 7B, in a state in which the light guide rod 5 is installed in the case 7, the value of the dimension between the rib guide portions 13 in the Y' direction is slightly larger than the value of the dimension of each of the ribs 11 in the Y' direction. Here, in the state in which the light guide rod 5 is installed in the case 7, the value of the dimension in the Y' direction between the rib guide portions 13 and the value of the dimension of the rib 11 in the Y' direction nay be made equal to each other. Further, the value of the dimension in the Y' direction between the rib guide portions 13 may be made slightly smaller than the value of the dimension of the rib 11 in the Y' direction. Then, the rib 11 may be configured to be sandwiched between the rib guide portions 13 by the urging force in the state in which the fight guide rod 5 is installed in the case 7.

While certain embodiments have been described, these embodiments have been presented by way of example only, and we not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A line illuminating device comprising:
   a light emitting unit that emits light;
   a light guide rod that is formed into a rod shape, transmits therethrough the light emitted by the light emitting unit, and guides the light in a longitudinal direction;
   a case that is formed into a rod shape, has an opening in a first direction when viewed from the longitudinal direction of the light guide rod, and houses the light guide rod therein;
   a first rib provided so as to protrude, in the first direction, from the light guide rod on a first end of the light guide rod in the longitudinal direction; and
   a first rib guide portion that is provided on the first end of the case in the longitudinal direction, guides the first rib when the light guide rod is housed in the case, restricts rotation of the light guide rod with respect to the case, and prevents the light guide rod from moving out of the opening of the case,
   wherein the first rib guide portion comprises two portions that respectively protrude toward each other from opposing sides of an inner surface of the case, on the first end of the case, with a gap defined by and between respective inner faces of the two portions that face each other, the gap configured to receive the first rib when the light guide rod is housed in the case,
   wherein a first protrusion is provided on a first side surface of the first rib, the first side surface facing in a second direction that is perpendicular to the first direction and the longitudinal direction, and the first protrusion protruding from the first side surface in the second direction, and
   wherein one of the inner faces of the two portions of the first rib guide portion includes a first recess that is recessed into the first rib guide portion in the second direction, the first protrusion configured to be engaged with the first recess when the light guide rod is housed in the case.

2. The line illuminating device according to claim 1, wherein
   a second rib is provided so as to protrude, in the first direction, from the light guide rod on a second end of the light guide rod in the longitudinal direction, opposite of the first end; and
   a second rib guide portion is provided on the second end of the case in the longitudinal direction, guides the second rib when the light guide rod is housed in the case, restricts the rotation of the light guide rod with respect to the case, and prevents the light guide rod from moving out of the opening of the case.

3. The line illuminating device according to claim 1, wherein
   a second protrusion is provided on a second side surface of the first rib, opposite of the first side surface, the second side surface facing in a third direction that is parallel and opposite to the second direction, and the second protrusion protruding from the second side surface in the third direction, and
   another of the inner faces of the two portions of the first rib guide portion includes a second recess that is recessed into the first rib guide portion in the third direction, the second protrusion configured to be engaged with the second recess when the light guide rod is housed in the case.

4. The line illuminating device according to claim 2, wherein no protrusion is provided on side surfaces of the second rib.

5. A line illuminating device comprising:
   a light emitting unit that emits light;
   a light guide rod that is formed into a columnar shape, introduces the light emitted from the light emitting unit into an inside thereof from a first longitudinal end of the light guide rod in a longitudinal direction, and guides the light in the longitudinal direction;
   a case that is formed into a rod shape, has an inner surface formed into a "U" shape by opening a part when viewed from the longitudinal direction, and houses the light guide rod therein while a circular-arc curved surface with the "U" shape and a half of an outer circumference of a circle of the light guide rod contact each other or face each other with a slight gap therebetween when viewed from the longitudinal direction;
   a rectangular parallelepiped first rib that is provided so as to protrude in a first direction from the light guide rod on only the first longitudinal end of the light guide rod in the longitudinal direction;
   a rectangular parallelpiped second rib that is provided so as to protrude from the light guide rod on only a second longitudinal end of the light guide rod that is opposite to the first longitudinal end, and the second rib overlaps the first rib when viewed from the longitudinal direction of the light guide rod;
   a first rib guide portion that is provided on the first longitudinal end of the case in the longitudinal direction, guides the first rib when the light guide rod is housed in the case, and restricts rotation of the light guide rod with respect to the case;
   a second rib guide portion that is provided on the second longitudinal end of the case in the longitudinal direction, overlaps the first rib guide portion when viewed from the longitudinal direction of the case, guides the second rib when the light guide rod is housed in the case, and restricts the rotation of the light guide rod with respect to the case, wherein the first rib guide portion comprises two portions that respectively protrude toward each other from opposing sides of the inner surface of the case, on the first longitudinal end of the case, with a gap defined by and between respective inner faces of the two portions that face each other, the gap configured to receive the first rib when the light guide rod is housed in the case, wherein a first protrusion is provided on a first side surface of the first rib, the first side surface facing in a second direction that is perpendicular to the first direction and the longitudinal direction, and the first protrusion protruding from the first side surface in the second direction, and wherein one of the inner faces of the two portions of the first rib guide portion includes a first recess that is recessed into the first rib guide portion in the second direction, the first protrusion configured to be engaged with the first recess when the light guide rod is housed in the case.

6. The line illuminating device according to claim 5, wherein a second protrusion is provided on a second side surface of the first rib, opposite of the first side surface, the second side surface facing in a third direction that is parallel and opposite to the second direction, and the second protrusion protruding from the second side surface in the third direction, and another of the inner faces of the two portions of the first rib guide portion includes a second recess that is recessed into the first rib guide portion in the third direction, the second protrusion configured to be engaged with the second recess when the light guide rod is housed in the case.

7. The line illuminating device according to claim 5, wherein no protrusion is provided on side surfaces of the second rib.

* * * * *